United States Patent
Hurst

(10) Patent No.: US 10,215,656 B2
(45) Date of Patent: Feb. 26, 2019

(54) SYSTEMS AND METHODS FOR LIQUID DYNAMIC PRESSURE TESTING

(71) Applicant: Kulite Semiconductor Products, Inc., Leonia, NJ (US)

(72) Inventor: Adam Hurst, New York, NY (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 15/864,647

(22) Filed: Jan. 8, 2018

(65) Prior Publication Data

US 2018/0128702 A1 May 10, 2018

Related U.S. Application Data

(63) Continuation of application No. 14/801,002, filed on Jul. 16, 2015, now Pat. No. 9,897,506.

(51) Int. Cl.
*G01L 27/00* (2006.01)

(52) U.S. Cl.
CPC .......... *G01L 27/005* (2013.01); *G01L 27/007* (2013.01)

(58) Field of Classification Search
CPC ...... G01L 27/005; G01L 27/007; G01L 27/00
USPC ................................. 73/1.57–1.68
See application file for complete search history.

(56) References Cited

U.S. PATENT DOCUMENTS

| | | | |
|---|---|---|---|
| 3,477,277 A | 11/1969 | Wostl | |
| 3,590,626 A | 7/1971 | Hugli | |
| 4,189,936 A | 2/1980 | Ellis | |
| 4,506,539 A | 3/1985 | Hessler | |
| 7,013,702 B1 * | 3/2006 | Millar | G01L 27/005 73/1.63 |
| 9,897,506 B2 * | 2/2018 | Hurst | G01L 27/005 |
| 2011/0268384 A1 * | 11/2011 | Akkaya | G01H 9/004 385/12 |
| 2015/0234089 A1 * | 8/2015 | Dakin | G01V 13/00 367/13 |

\* cited by examiner

*Primary Examiner* — Robert R Raevis
(74) *Attorney, Agent, or Firm* — Troutman Sanders LLP; James E. Schutz; Mark Lehi Jones

(57) ABSTRACT

Certain implementations of the disclosed technology may include systems and methods for dynamic pressure testing of transducers in communication with a liquid. A method is provided that can include dynamically pressurizing a liquid in a cavity associated with a housing. While dynamically pressurizing the liquid, the method includes simultaneously measuring: a change in volume of the liquid; a test frequency response, by a test transducer in communication with the liquid; and a reference frequency response, by a reference transducer in communication with the liquid. The method may further determine a normalized frequency response of the test transducer, based at least in part on the test frequency response and the reference frequency response. The method may further provide an indication of the normalized frequency response of the test transducer and an indication of the bulk modulus of the liquid.

11 Claims, 10 Drawing Sheets

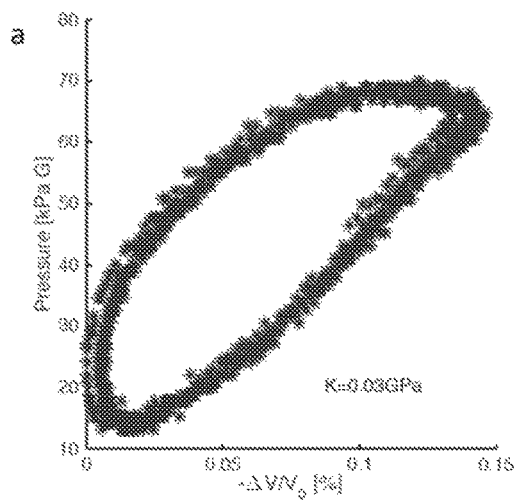
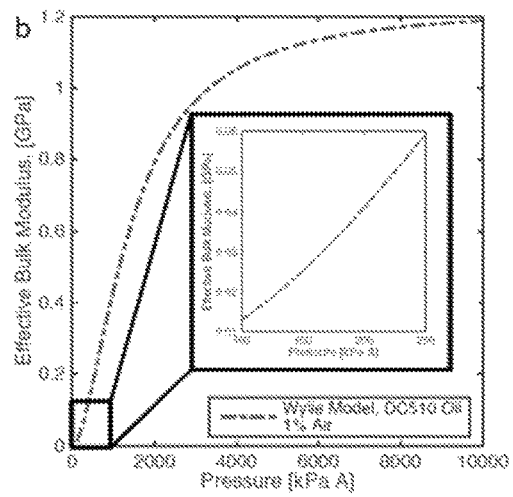
FIG. 9a          FIG. 9b

SYSTEMS AND METHODS FOR LIQUID DYNAMIC PRESSURE TESTING

CROSS-REFERENCE TO RELATED APPLICATIONS

This application is a continuation of U.S. patent application Ser. No. 14/801,002, filed 16 Jul. 2015, and published as U.S. Patent Publication US 2017/0016793 on 19 Jan. 2017, the contents of which are incorporated herein by reference as if presented in full.

BACKGROUND

Pressure transducer assemblies that are used for measuring liquid pressures in certain systems can be adversely impacted by pressure ripples and/or pressure pulses that propagate through the liquid. Pumping equipment, for example, may create pressure ripples in the liquid, and such ripples can negatively influence the accuracy of the pressure measured by the transducer, shorten the life expectancy of the transducer, and/or destroy the transducer if it is not properly protected.

In certain systems, pressure ripple may be unavoidable, but it may be desired to measure the steady-state pressure of a liquid while minimizing the effects of pressure ripples. In such systems, a filter assembly may be inserted at the front end of the transducer to attenuate or eliminate the higher frequency ripples. However, the design of the filter and the associated transducer must typically be matched to the specific application and the individual system parameters.

In order to study the dynamic response of pressure transducers and pressure measurement systems in liquid media, a liquid-based dynamic pressure calibration apparatus is needed.

SUMMARY

Some or all of the above needs may be addressed by certain implementations of the disclosed technology. The disclosed technology includes systems and methods for dynamic pressure testing of transducers in communication with a liquid or fluid, such as oil. In accordance with an example implementation of the disclosed technology, a method is provided that can include dynamically pressurizing a liquid in a cavity associated with a housing. While dynamically pressurizing the liquid, the method may include simultaneously measuring: a change in volume of the liquid; a test frequency response, by a test transducer in communication with the liquid; and a reference frequency response, by a reference transducer in communication with the liquid. The method may further determine a normalized frequency response of the test transducer, based at least in part on the test frequency response and the reference frequency response. The method may further include outputting an indication of the normalized frequency response of the test transducer. In certain example implementations, the method may further include determining a bulk modulus of the liquid, and outputting an indication of the bulk modulus of the liquid.

According to another example implementation, a test apparatus is provided. The test apparatus may include: a housing including a cavity and configured for containing a liquid; a reference transducer mounted on the housing and configured for communication with the liquid; a test article including a test transducer, the test article configured for mounting on the housing and further configured for communication with the liquid; at least one computer processor in communication with the reference transducer and the test transducer; a piston in communication with the liquid and configured to slidingly engage with a portion of the cavity; and an actuator in communication with the piston and configured to vibrate the piston to dynamically pressurize the liquid. The test apparatus is configured for simultaneously determining a bulk modulus of the liquid; and determining a normalized frequency response of the test article.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 9a shows pressure vs. experimentally observed bulk modulus of a liquid under test.

FIG. 9b shows a model of effective bulk modulus of the liquid with 1% entrained air.

DETAILED DESCRIPTION

Figure 1:
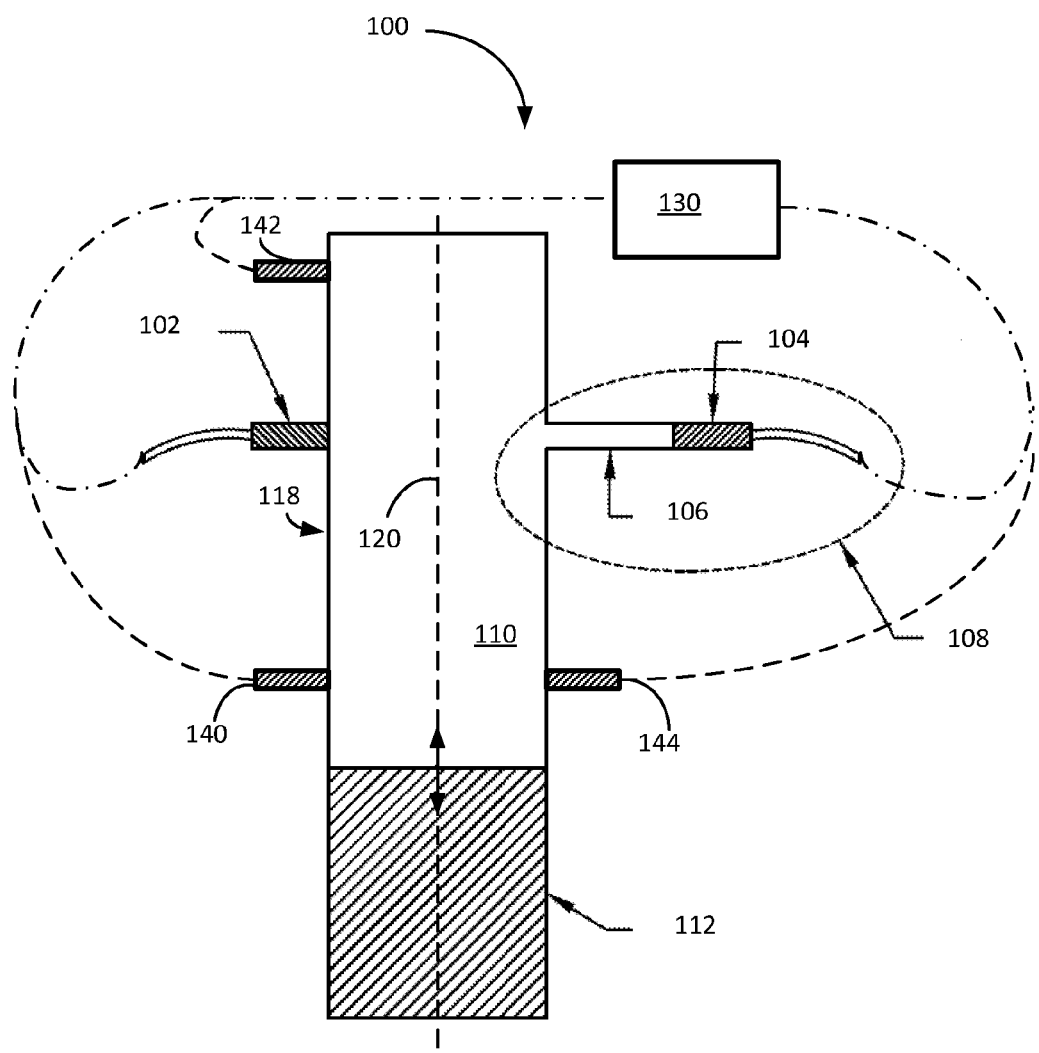
FIG. 1 is a block diagram of an illustrative liquid-based dynamic pressure calibration apparatus 100 according to an example implementation of the disclosed technology.

Although preferred embodiments of the disclosed technology are explained in detail, it is to be understood that other embodiments are contemplated. Accordingly, it is not intended that the disclosed technology is limited in its scope to the details of construction and arrangement of components set forth in the following description or illustrated in the drawings. The disclosed technology is capable of other embodiments and of being practiced or carried out in various ways.

As used in the specification and the appended claims, the singular forms "a," "an," and "the" include plural referents unless the context clearly dictates otherwise.

It is intended that each term presented herein contemplates its broadest meaning as understood by those skilled in the art and may include all technical equivalents, which operate in a similar manner to accomplish a similar purpose.

Ranges may be expressed herein as from "about" or "approximately" one particular value and/or to "about" or "approximately" another particular value. When such a range is expressed, another embodiment may include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Referring now to the drawings, in which like numerals represent like elements, exemplary embodiments of the disclosed technology are herein described. It is to be understood that the figures and descriptions of the disclosed technology have been simplified to illustrate elements that are relevant for a clear understanding, while eliminating, for purposes of clarity, other elements found in typical test assemblies. Those of ordinary skill in the art will recognize that other elements may be desirable and/or may be required in order to implement the disclosed technology. However, because such elements are well known in the art, and because they may not facilitate a better understanding, a discussion of such elements is not provided herein.

FIG. 1 is a block diagram of an illustrative liquid-based dynamic pressure calibration test apparatus 100 according to an example implementation of the disclosed technology. In certain example implementations, the test apparatus 100 may perform two critical measurements simultaneously: (1) frequency response of one or more transducers in communication with the liquid, and (2) a bulk modulus of the liquid. These measurements may be utilized to characterize a response of a transducer, for example, as a function of pressure of the liquid, amount of air entrapped in the liquid, frequency of pressure ripple in the liquid, and/or the presence (or absence) of pressure ripple filtering structure(s) associated with the transducer.

According to an example implementation, the test apparatus 100 may utilize a piston 112 to vibrate liquid 110 in communication with a reference transducer 102 and a test transducer 104, for example, to dynamically calibrate and/or experimentally determine the frequency response of the test transducer 104. In an example implementation, the test apparatus 100 may include a cavity in the form of a column having a same or similar diameter as the piston 112, for example, so that the liquid 110 is at least partially constrained to the shape of the column-shaped cavity.

In accordance with certain example implementations of the disclosed technology, the test apparatus 100 may include one or more additional transducers or sensors 140, 142, 144. These additional sensors 140, 142, 144 may be utilized, for example, to measure certain aspects associated with the test apparatus 100 and/or liquid 110 under test, including but not limited to: vibrational characteristics, displacement of the various components, bulk modulus of the liquid 110, speed of pressure ripples in the liquid 110, etc., as will be discussed further below.

In certain example implementations, the test transducer 104 may be part of a test article 108 for which the characterization is desired. In certain example implementations, the test article 108 may include a filter section 106 having various geometries (as will be discussed below) and configured to dampen pressure ripples that may propagate through the liquid 110. According to certain example implementations, the test apparatus 100 may measure the bulk modulus of the liquid 110 at low pressures. For example, the measurement of the bulk modulus of the liquid 110 may be achieved with the aid of additional sensors including, accelerometers, strain gauges, and/or additional dynamic pressure transducers.

In accordance with an example implementation of the disclosed technology, the bulk modulus of the liquid 110 may provide an indication of the amount of entrained and/or dissolved gases within the liquid 110. For example, gases such as air may be mixed or dissolved into the liquid 110 and can add substantial damping to the dynamic response of a system. Therefore, knowledge of the bulk modulus may be critical for a measurement and/or calibration of the frequency response of a system when operating with liquid media.

In accordance with an example implementation of the disclosed technology, the test apparatus 100 may be utilized to measure a bulk modulus of the liquid 110, for example, by a first method that may include measuring a change in volume of the liquid 110 while simultaneously measuring the resulting change in pressure. According to certain example implementations, the bulk modulus may be determined by a second method that can include measuring the speed of sound within the liquid 110, for example, by using a difference in the time of arrival of a wave between two dynamic pressure transducers mounted in different locations along the axis of the vibrating liquid 110.

In yet other disclosed implementations, the bulk modulus of the liquid 110 may be measured by both of the above-mentioned methods for enhanced accuracy and cross checking. In certain example implementations, the bulk modulus may be measured simultaneously (or separately) using both of the above-mentioned methods. Certain example implementations may include pressurizing the liquid 110 (and any entrained air) to any suitable pressure range needed to characterize the associated test transducer 104.

Certain example implementations of the disclosed technology may provide for measurement of the bulk modulus of the liquid 110, via the independent methods described above (i.e., pressure vs. volume, speed of sound), while simultaneously measuring the frequency (dynamic) response of a test pressure transducer 104 and/or associated filter structure 106 in communication with the liquid 110.

In certain example implementations of the disclosed technology, the reference transducer 102 may be utilized, for example, to provide a reference measurement, for example, to account for various different configurations associated with the test article 108. In certain example implementations of the disclosed technology, the test apparatus 100 may allow testing transducers 104 of various geometries and having various associated filters 106, tubes, etc., as will be discussed below with reference to FIGS. 2-6.

As discussed above, even a small amount of entrained or dissolved gas in the liquid 110 may dramatically affect the system frequency response measured by the test pressure transducer 104. Thus, in accordance with certain example implementations of the disclosed technology, by simultaneous measuring of the bulk modulus of the liquid 110 and the frequency response of the transducer 104, accurate, reproducible frequency response calibration can be achieved.

According to an example implementation of the disclosed technology, and as depicted in FIG. 1, the test apparatus 100 can include housing with a cavity to contain the liquid 110. In one example implementation, the housing 118 may be machined into a suitable material. For example, in one implementation, the housing 118 may be formed in an acrylic block. In certain example implementations the housing 118 may be transparent to aid in visual confirmation of appropriate levels of fluid in the cavity, for example. As mentioned above, the main housing 118 cavity for containing the liquid 110 may be in the form of a column having a same or similar diameter as the piston 112, for example, so that the liquid 110 is at least partially constrained to the shape of the column-shaped cavity.

In an example implementation, the housing 118 associated with the test apparatus 100 may include two or more pressure transducer mounting ports located directly across from each other. For example, in one embodiment, the pressure ports may be configured in a symmetric geometry with openings or bores in communication with the main cavity and normal to the axis 120 of the housing 118 and piston 112. Such a configuration may provide substantially equal pressure ripples via the liquid 110 to the opposing transducers.

In an example implementation, the piston 112 may include one or more o-rings to act as a liquid seal, and a top portion of the piston 112 with the o-rings may fit inside a bottom portion of the cavity, while the bottom portion of the piston 112 may be in communication with or directly attached to shaker table or similar actuator (not shown).

Once assembled, the test apparatus 100 may be filled with the working liquid media 110 via an additional fill tube (not shown). In accordance with an example implementation of the disclosed technology, the process of filling the cavity with the liquid may be critical to the accuracy and performance of the calibration and measurement. For example, and as previously discussed, air (or other gas) bubbles within the liquid 110 may compress as the piston 112 vibrates, resulting in negligible (for example, <1 kPa) dynamic pressures within the system, since air is easily compressible, but liquid is typically not. However, without any air within the system, the liquid 110 itself may only slightly compress, yielding a possible large magnitude of dynamic pressures (for example >350 kPa). The general example of the dynamic pressures within the cavity, as discussed here, are for example only. Other factors, such as the actuator/piston/shaker size and input power may influence the dynamic pressures (in addition to the amount of entrained air. For example, larger shakers and higher input power can be used to create larger dynamic pressures over a variety of frequencies. In certain example implementations, the test apparatus 100 may be configured to produce large peak-to-peak dynamic pressures, for example, >350 kPa (50 psi), over the frequency range of approximately 10 Hz to approximately 5 kHz. In other example implementations, the frequency range may be extended to upwards of 20 KHz or greater.

In accordance with an example implementation of the disclosed technology, one or more of the transducers 102 104 associated with the test apparatus 100 may be in communication with a multi-channel acquisition system 130. In certain example implementations, the acquisition system 130 may include one or more computer processors in communication with a memory. In certain example implementations, the acquisition system 130 may include one or more of: signal conditioners, electronic filters, analog-to-digital converters, etc., for example, to receive, condition, convert, and store signals received from the various sensors associated with the test apparatus 100.

In an example implementation, the operation of the test apparatus 100 may be validated with two equally configured dynamic pressure transducers mounted directly across from each other at substantially the same vertical location on the housing 118. The housing 118 cavity may be filled with the test liquid (such as oil, for example) and preloaded, for example, by securing the housing 118 to a stationary portion of the shaker/actuator. In accordance with an example implementation of the disclosed technology, the preloading may improve the shape of the resulting pressure waveforms, for example, to correspond with the actual dynamic displacement of the shaker/actuator, which in certain embodiments may be sinusoidal. Furthermore, the measured pressure amplitude and/or phase may vary as a function of frequency of the vibration due to various resonances of the system. Thus, the operation of test apparatus 100 and the equally configured dynamic pressure transducers may be further validated by comparing their measured frequency responses to verify that they are substantially equal. In certain example implementations, the validation process described here may be utilized prior to actual testing and characterization of a test article 108.

In certain example embodiments, the test apparatus 100 may include the two equally configured dynamic pressure transducers mounted directly across from each other (not shown) on the cavity housing 118 in addition to the reference transducer 102 and the test article 108 (also mounted directly across from each other). In this embodiment, the validation of the test may be performed at the same time as the test article 108 characterization without requiring the separate validation process, which may involve draining and re-filling the cavity with the liquid 110.

In accordance with an example implementation of the disclosed technology, air-free liquid filling of the cavity housing 118 may be achieved by placing the assembled test apparatus 100 in a vacuum chamber with the fill tube (not shown) submerged in liquid. Upon evacuating the vacuum chamber, air may be slowly released from the liquid into the vacuum chamber resulting in air-free filling of the cavity housing 118 with liquid. In certain example implementations, the fill tube may then be crimped and/or welded closed.

In certain implementations, for example, where the test apparatus 100 housing 118 may include a transparent or translucent material (such as acrylic, for example), visual inspection of air bubbles within the liquid-filled cavity housing 118 may be enabled. If air bubbles are identified, vacuum refilling may be redone.

In accordance with certain example implementations of the disclosed technology, and with reference to FIGS. 2-5, the test article 108 may include a pressure transducer assembly that utilizes a filter assembly adapted to attenuate certain pressure ripple frequencies, for example, to attenuate certain resonances or ranges of frequencies. In certain example implementations, the filter assembly may comprise one or more mechanical structures and configurations, including but not limited to:

tubes 106 (see FIG. 2);
various shaped cavities 120 (see FIG. 3);
tubes 106 with various lengths 122 and diameters (see FIG. 3);
sensor 104 diaphragms with various diameters 124 (see FIG. 4);
porous structures 128 (see FIG. 5); and/or
combinations of the above structures and configurations.

In accordance with an example implementation of the disclosed technology, the test article 108 may be tuned by the filter assembly (and/or the associated various configurations) to achieve a desired frequency response and/or attenuation of certain frequencies. Those skilled in the art may appreciate that certain pressure media may comprise high frequency pressure ripples that can interfere with the accuracy of the sensing element and shorten its operable lifespan. The pressure transducer assembly disclosed herein may be tuned via the filter assembly to eliminate undesirable high frequency ripples and pass through desirable static and quasi-static pressures. Specifically, dependent on the properties of the pressure media to be measured, such as its viscosity, the filter assembly and sensor configurations may be adjusted to achieve desired dampening parameters.

Figure 2:
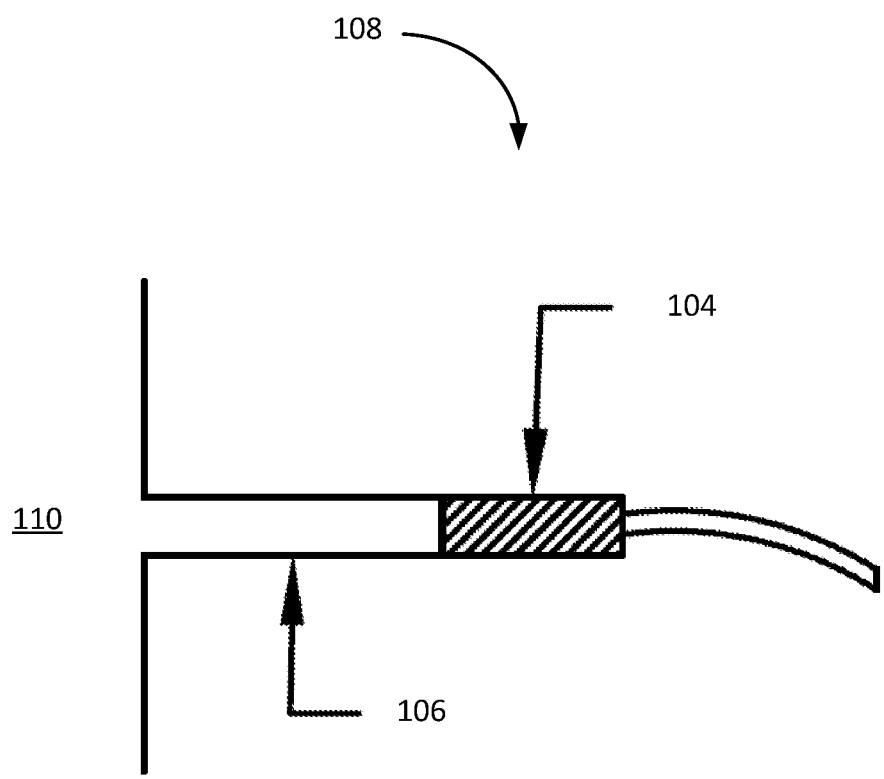
FIG. 2 is a block diagram of an illustrative test article 108, according to an example implementation of the disclosed technology.

With reference to FIG. 2, one skilled in the art may appreciate that narrowing the tube 106 (i.e., decreasing the diameter) may enhance attenuation. However, if the tube 106 is too narrow for the applied pressure media, desirable low frequency components (e.g., static and quasi-static pressures), which may interfere with the accuracy of the sensing element 104, may also be eliminated. Conversely, if the tube 106 is too wide, high frequency ripples may not sufficiently eliminated, which may also interfere with the accuracy of the sensing element 104 and decrease its operable lifespan.

Figure 3:
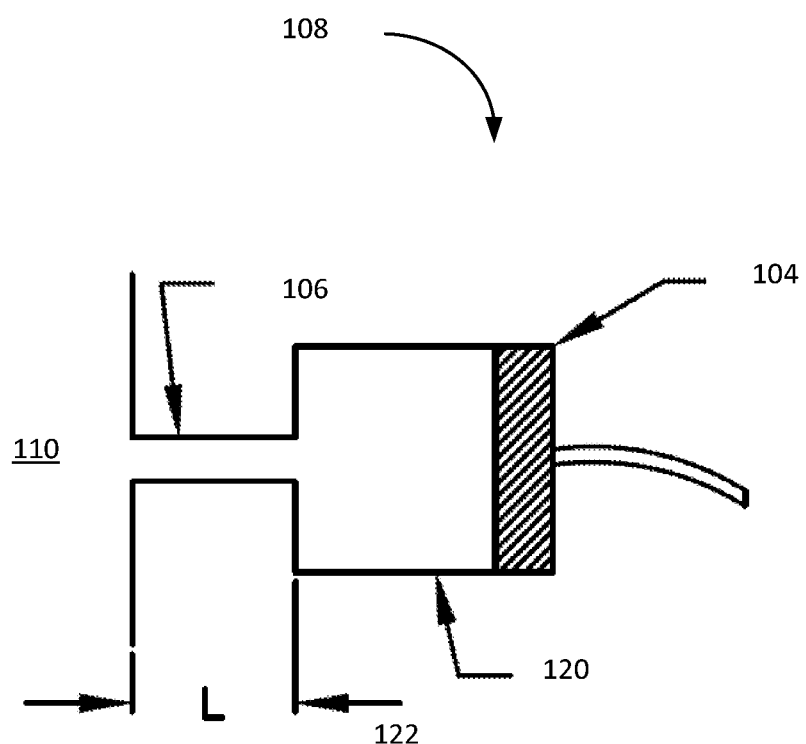
FIG. 3 is a block diagram of another illustrative test article 108, according to an example implementation of the disclosed technology.
Figure 4:
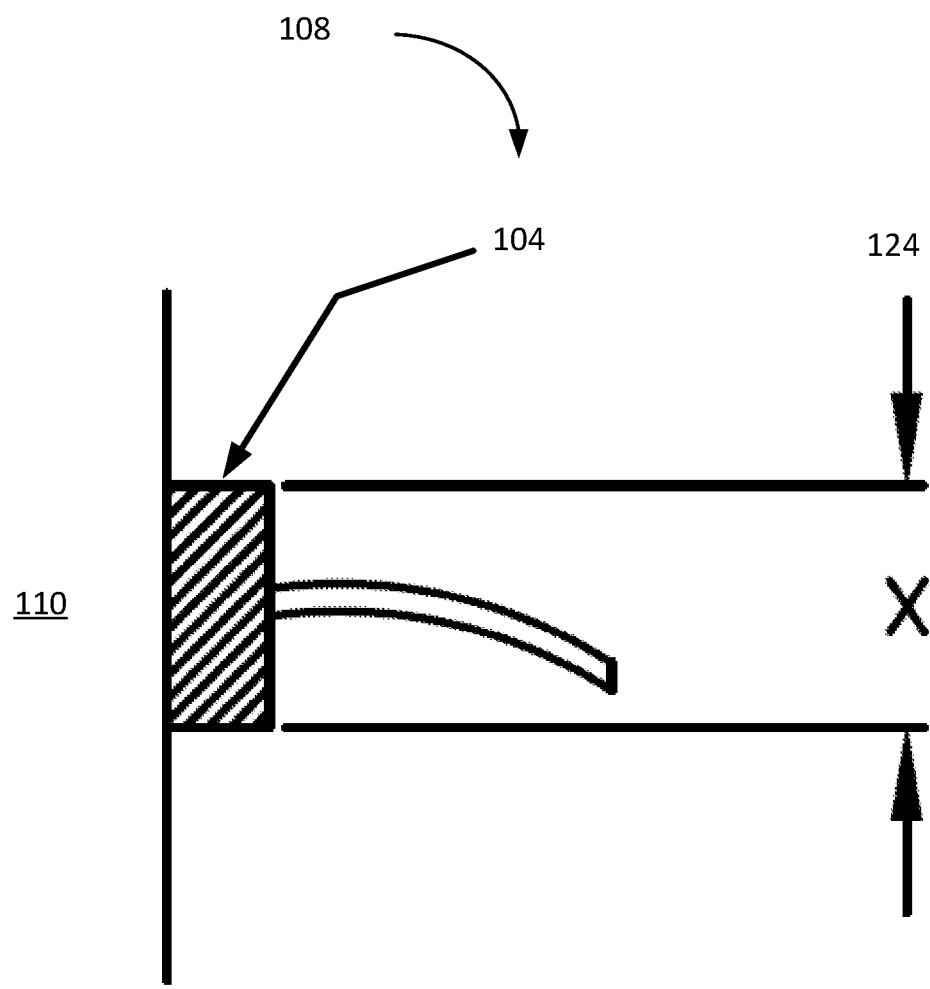
FIG. 4 is a block diagram of another illustrative test article 108, according to an example implementation of the disclosed technology.
Figure 5:
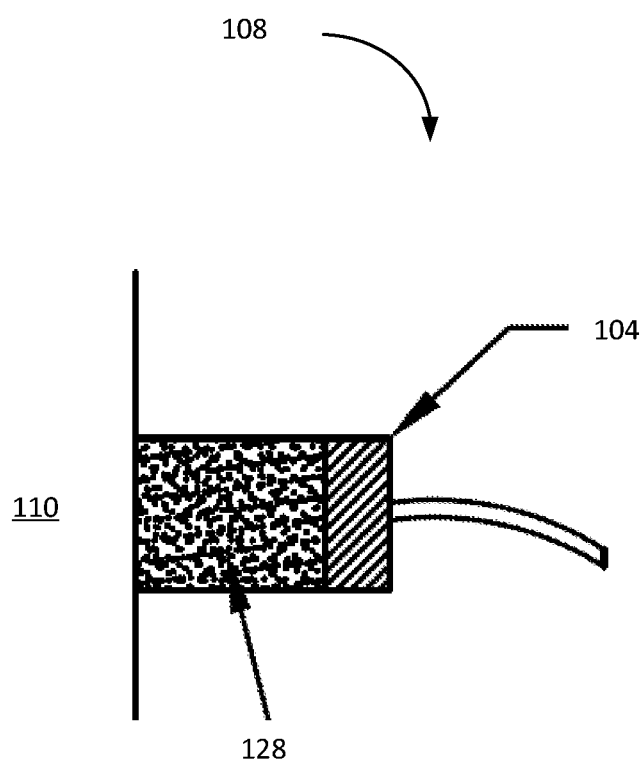
FIG. 5 is a block diagram of another illustrative test article 108, including a mechanical filter 128, according to an example implementation of the disclosed technology.

With reference to FIG. 3, by varying only the length 122 of the tube 106 and/or other associated components (such as the cavity volume 120, etc.), a single pressure transducer assembly design may be tuned to many different systems having varying pressure media properties. In certain example implementations, the actual length 122 of the tube 106 may be changed. For example, to shorten the filter assembly, the tube 106 may be pushed towards the test sensor 104, which consequently may effectively reduce the area of the cavity volume 120 around the sensing element 104. In certain example implementations, shortening the tube 106 may expose the pressure media (i.e., liquid 110) to more of the sensor channel defined within the cavity housing 118, and may have minimal influence on the overall frequency response. Conversely, to lengthen the tube 106, it may be pulled away from the test sensor 104, which consequently may effectively increase the area of the cavity volume 120 around the sensing element 104.

In accordance with an example implementation of the disclosed technology, certain test filter assemblies may be configured so the tube 106 may slide within the pressure transducer assembly to vary the filter properties. Once the desired tuning is achieved, the filter assembly may be fixed, for example, standard welding techniques.

In accordance with another example implementation of the disclosed technology, certain test filter assemblies may be configured with custom lengths and/or diameters of the tube 106 for specific filtering properties. Thus, pressure transducer assemblies having common properties may be manufactured, and each assembly can be subsequently tuned to a desired system, thereby reducing costs associated with designing one unique pressure transducer assembly for one unique system.

Figure 6:
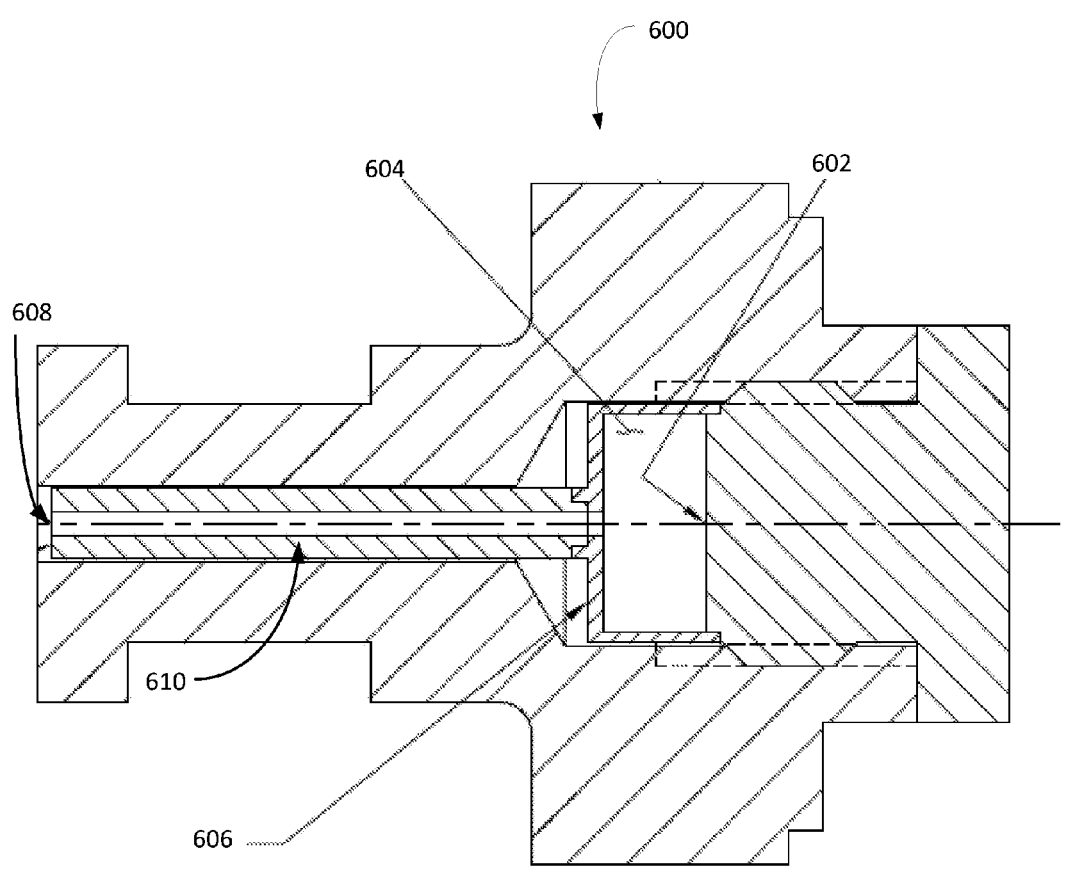
FIG. 6 is a block diagram of an example transducer assembly 600, including a filter comprising a small diameter tube 610, according to an example implementation of the disclosed technology.

FIG. 6 depicts an example transducer assembly 600, according to an example implementation of the disclosed technology. In this example assembly 600, a sensing element 602 may be in communication with a cavity 604 defined by a cap 606, which may be filled with a liquid via a media entrance 608 and the small diameter tube 610. For example, the liquid may enter the media entrance 608 and travel through the tube 610 to the cavity 604. In an example implementation, the pressures exerted by the liquid at the media entrance 608 may be filtered by the tube 610 and in communication with the sensing element 602.

As previously described and with continued reference to FIG. 1, the test apparatus 100 may include additional sensors 140, 142, 144, etc., through which bulk modulus may be measured using one or more measurement techniques. For example, one measurement technique may utilize two accelerometers: one mounted to the shaker arm and a second on the top of the housing 118. In an example implementation, a strain gauge may be mounted on the piston 112. The acceleration of the shaker arm may be integrated twice to determine the displacement of the shaker arm. Similarly, the displacement of the cavity housing 118 may be determined from its measured (and twice integrated) acceleration. The deflection of the piston cavity housing 118 may be determined from the strain gauge measurement. In an example implementation, the measured deflection from these three sensors may be combined/analyzed to determine the deflection of the liquid 110 column in the cavity. With the known initial volume, the bulk modulus of the liquid can be computed using the following equation:

$$E = V \cdot \left(\frac{\partial p}{\partial V}\right) \tag{1}$$

where V is the initial volume of the liquid and $$\frac{\partial p}{\partial V}$$

is the change in pressure over change in volume. When practically used, most fluids have some quantity of dissolved and entrained air which gives rise to an effective bulk modulus of a liquid-air mixture, Eeff, which can be predicted using the following equation:

$$Eeff = \frac{E_{Oil}}{1 + \alpha\left(\left(\frac{p_o}{p}\right)^{\frac{1}{K}}\right) \cdot \left(\frac{E_{Oil}}{K \cdot p} - 1\right)} \tag{2}$$

where α is the percent volumetric content of entrained air at the initial pressure, $p_o$ is the initial pressure, p is the applied pressure, K is the polytropic constant of air and $E_{Oil}$ is the bulk modulus of the liquid (for example, oil) under test.

As discussed previously, the strain gauge mounted on the piston 112, the accelerometer on the shaker arm, and an additional accelerometer to the top of the cavity housing may 118 enable the deflection (i.e., compression) of the liquid/air media to be measured, albeit indirectly.

Figure 7:
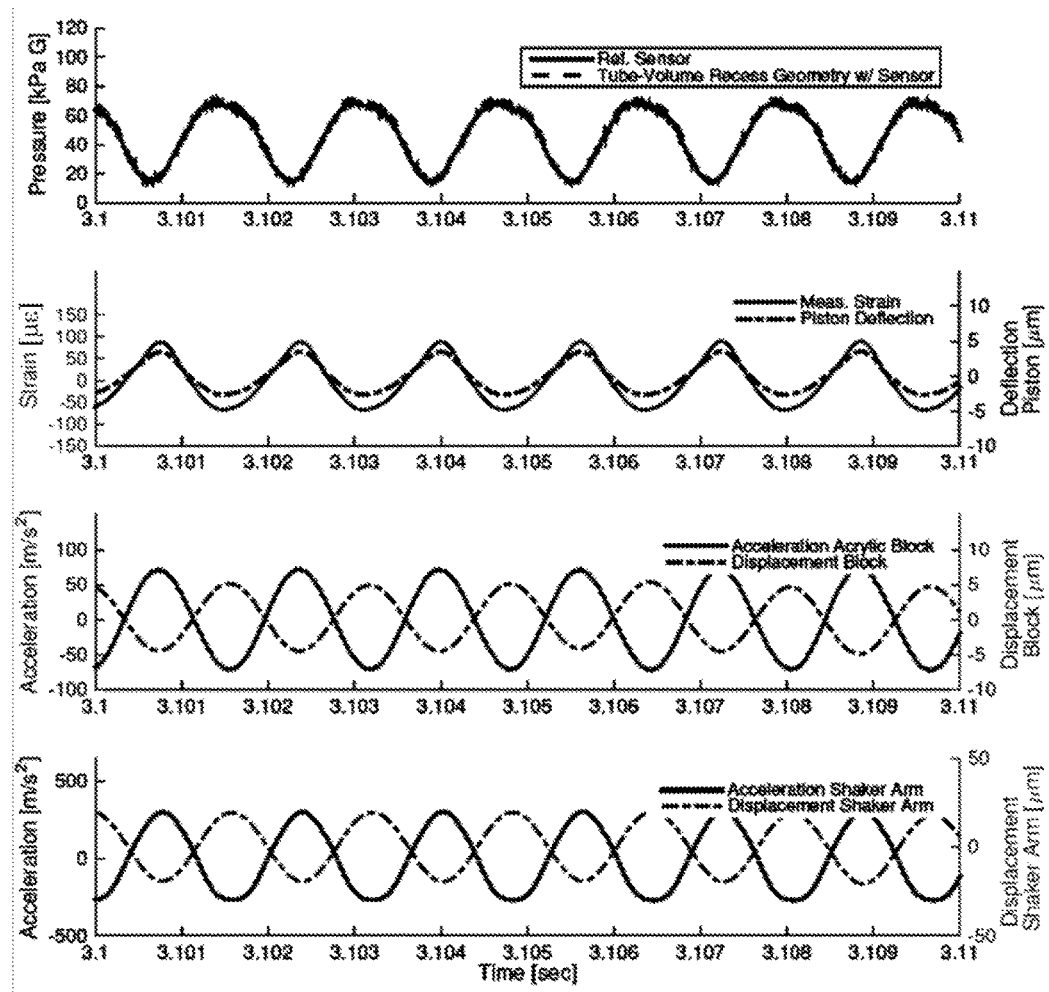
FIG. 7 shows experimental measurement results of the dynamic pressure calibration apparatus 100, according to an example implementation of the disclosed technology.

FIG. 7 shows measurement plots (from top to bottom) of applied pressure, measured strain/deflection, acceleration/displacement of the housing 118 (which in this case is made from an acrylic block), and the acceleration/displacement of the shaker arm, each as a function of time on the x-axis. The bottom two acceleration plots (continuous lines) are integrated twice to determine the associated displacement (dashed lines) of the cavity housing and shaker arm. As anticipated, the shaker arm exhibits the greatest measured displacement. In accordance with an example implementation, the deflection of the liquid column in cavity housing 118 may be determined by taking a difference of the displacement of the cavity housing 118 and the displacement of the shaker arm. Furthermore, in an example implementation, the deflection of the piston 112 may be added to the above difference as it is compressing the liquid, resulting in a determined deflection of the liquid column with the change in pressure.

Figure 8:
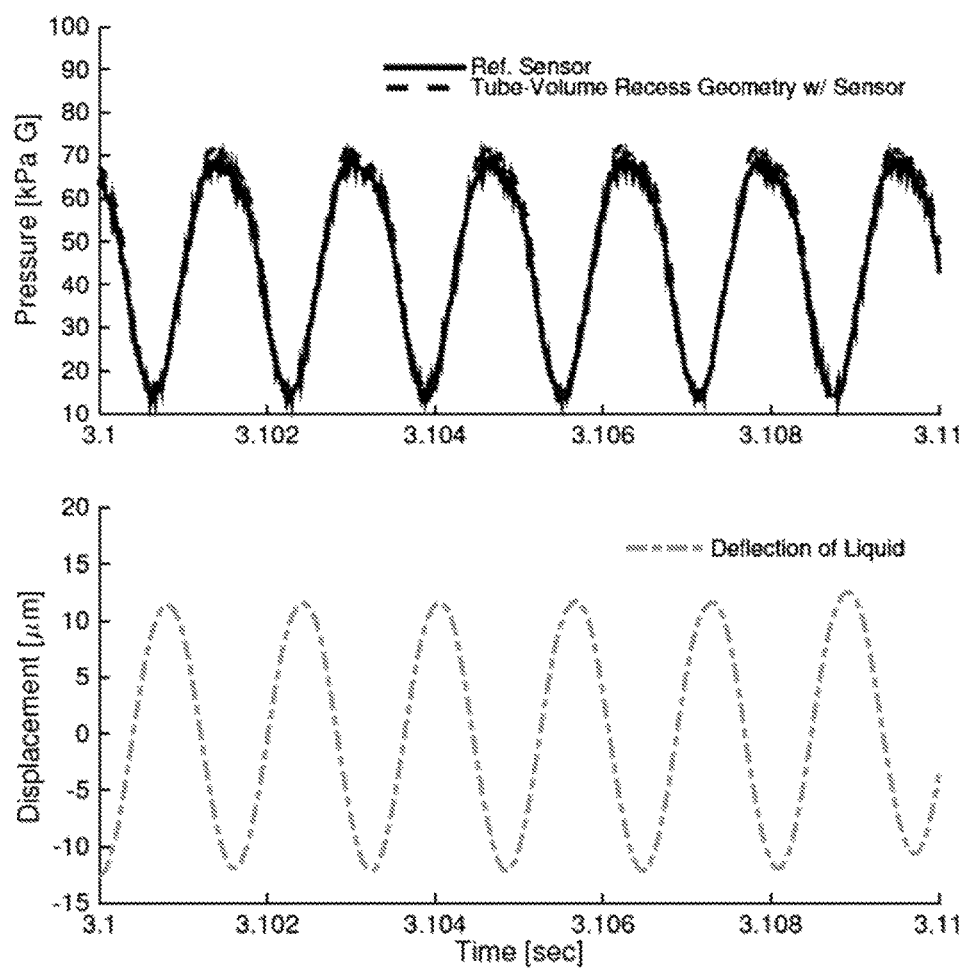
FIG. 8 shows experimental pressure and displacement of a liquid under test.

FIG. 8 shows the experimental pressures experienced by the reference transducer 102 and a test article 108 (top plot), and calculated displacement of the liquid 110 (bottom plot). In an example implementation, and from the measurement of displacement of the liquid 110, the change in volume may be computed as a percentage of the total volume within the liquid filled column.

FIG. 9a shows pressure vs. experimentally observed bulk modulus of a liquid under test, and FIG. 9b shows a Wylie model of effective bulk modulus of the liquid with 1% entrained air. These plots show an experimentally observed effective bulk modulus of 0.03 GPa which is in agreement with the predicted bulk modulus for the liquid used in an example test with 1% entrained air at these pressures. Note that these plots indicate that the data exhibits a significant hysteresis, which may be related to the low test pressures. As the Wylie model in FIG. 9b predicts, the bulk modulus approaches its true value at substantially higher pressures ~10 MPa (1500 psi) with smaller error predicted at higher pressures. In accordance with an example implementation of the disclosed technology, and based upon the measured effective bulk modulus, it may be determined that the specific example liquid in this experimental system example contains approximately 1% air.

In accordance with an example implementation of the disclosed technology, the effective bulk modulus of a liquid may primarily depend on pressure and entrained air, which has been confirmed by previous experimenters. However, certain embodiments of the disclosed technology provide significant technical improvements over previous or conventional measurement methods in that the bulk modulus is experimentally observed to estimate entrained air, while simultaneously capturing the frequency response of a given geometry of a test article 108. In an example implementation, the correlation of entrained air in the liquid 110 and the observed damping over the frequency response enables a prediction of the performance of a pressure sensor (configured with a similar or same geometry as the test article 108) within a different system of the same working liquid.

In accordance with an example implementation of the disclosed technology, the bulk modulus of the liquid under test can also be determined based upon the speed of sound in the liquid media. For example, the speed of sound depends on the bulk modulus of the fluid through the following equation:

$$c = \sqrt{\frac{K}{\rho}} \quad (3)$$

where c is the speed of sound, K is bulk modulus and ρ is the density of the fluid. Using the known distance along the vibrating column of liquid 110, for example, between a first and second dynamic pressure transducer (not shown), and a measured difference in the wave time of arrival at each of these transducers, the speed of sound in the liquid 110 may be extracted. According to an example implementation of the disclosed technology, with two independent measurements of bulk modulus, a greater level of measurement confidence may be achieved.

Figure 10:
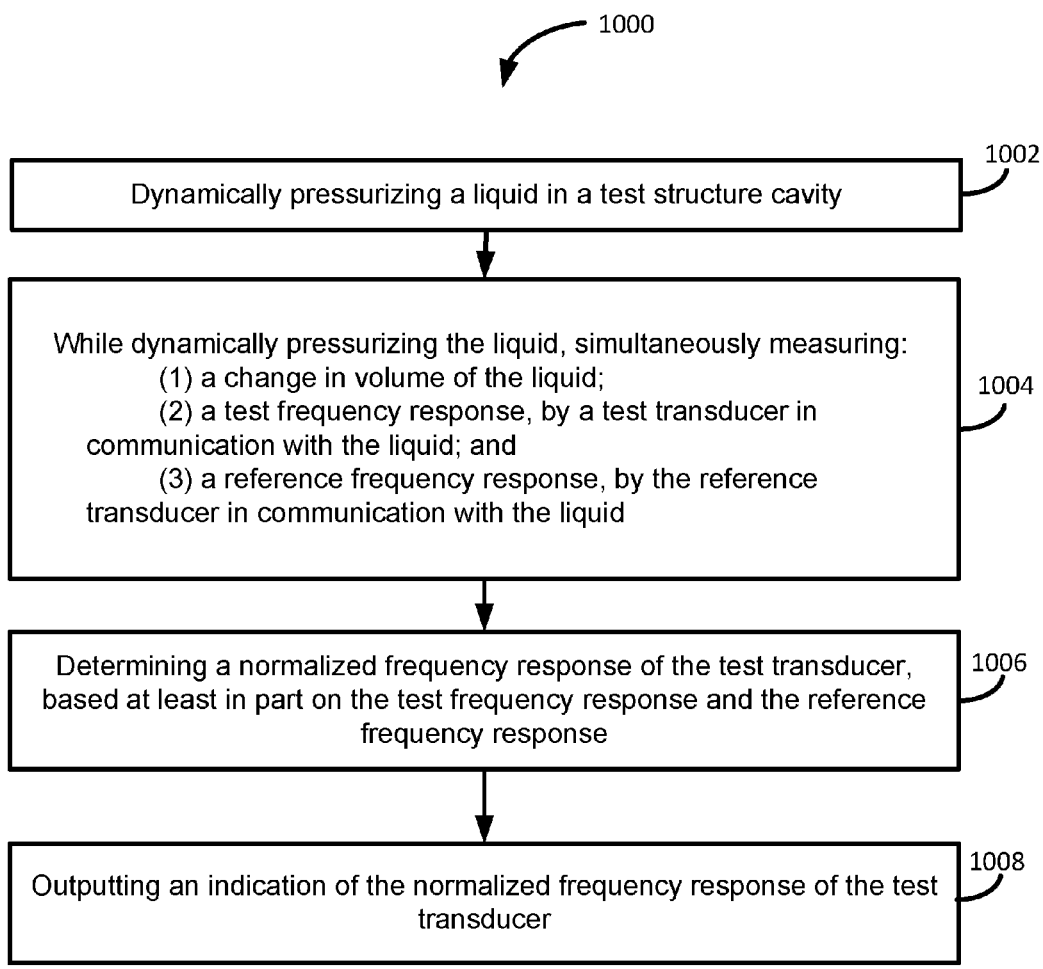
FIG. 10 is a flow diagram of a method according to an example implementation of the disclosed technology.

FIG. 10 is a flow diagram of a method 1000 according to an example implementation of the disclosed technology. In block 1002, the method 1000 includes dynamically pressurizing a liquid in a cavity associated with a housing. While dynamically pressurizing the liquid, and as indicated in block 1004, the method 1000 includes simultaneously measuring: a change in volume of the liquid; a test frequency response, by a test transducer in communication with the liquid; and a reference frequency response, by a reference transducer in communication with the liquid. In block 1006, the method 1000 includes determining a normalized frequency response of the test transducer, based at least in part on the test frequency response and the reference frequency response. In block 1008, the method 1000 includes outputting an indication of the normalized frequency response of the test transducer.

In certain example implementations, the simultaneously measuring can further include one or more of: measuring, by one or more of the reference transducer and the test transducer, a pressure of the liquid in the housing; measuring a displacement of a piston structure in communication with the liquid; determining a change in volume of the liquid based on the displacement of the piston; determining a bulk modulus of the liquid based on the measured pressure and the determined change in volume of the liquid; and outputting an indication of the bulk modulus of the liquid.

In certain example implementations, the determination of the bulk modulus of the liquid may be based on the measured speed of sound in the pressurized liquid.

Certain example implementations can include filtering, by a mechanical filter, the pressurized liquid in communication with the test transducer. In accordance with certain example implementations of the disclosed technology, the mechanical filer may include one or more of: a porous structure; a narrow tube; a cavity; a recessed structure; and/or a surface area of a test diaphragm associated with the test transducer that differs from a surface area of a reference diaphragm associated with the reference transducer.

In certain example implementations, determining the normalized frequency response can include storing in a memory in communication with one or more computer processors, the test frequency response and the reference frequency response, and comparing, by the one or more computer processors, the test frequency response and the reference frequency response.

In one example implementation, the test and reference transducers include different structures. In another example implementation, the test and reference transducers comprise substantially similar structures.

According to an example implementation of the disclosed technology, the test transducer and the reference transducers are disposed at an equal vertical position in the housing and in communication with the liquid under test. In certain example implementations, the test transducer and the reference transducers may be disposed opposing one another in the housing.

According to another example implementation, a test apparatus is provided. The test apparatus may include: a housing comprising a cavity and configured for containing a liquid; a reference transducer mounted on the housing and configured for communication with the liquid; a test article comprising a test transducer, the test article configured for mounting on the housing and further configured for communication with the liquid; at least one computer processor in communication with the reference transducer and the test transducer; a piston in communication with the liquid and configured to slidingly engage with a portion of the cavity; and an actuator in communication with the piston and configured to vibrate the piston to dynamically pressurize the liquid. The test apparatus is configured for simultaneously determining a bulk modulus of the liquid and determining a normalized frequency response of the test article.

In certain example implementations, determining the normalized frequency response can include storing, in a memory in communication with the one or more computer processors, a test frequency response of the test transducer, and a reference frequency response of the reference transducer. In certain example implementations, determining the normalized frequency response can include comparing, by the one or more computer processors, the test frequency response and the reference frequency response.

In an example implementation, determining the bulk modulus may include one or more of: dynamically pressurizing, by the piston, the liquid in the cavity; measuring, by one or more of the reference transducer and the test transducer, a pressure of the liquid; measuring a displacement of the piston in communication with the liquid; determining a change in volume of the liquid based on the displacement of the piston; and determining the bulk modulus of the liquid based on the measured pressure and the determined change in volume of the liquid.

In accordance with an example implementation of the disclosed technology, the test apparatus may further include a first transducer disposed at a first distance from the piston and configured to provide a first measurement signal; and a second transducer disposed at a second distance from the piston and configured to provide a second measurement signal. In certain example implementations, determining the bulk modulus can include measuring a speed of sound in the liquid. For example, the speed of sound in the liquid may be based on a time difference of the first and second measurement signals.

In accordance with certain example implementations of the disclosed technology, the test article may include a filter including or more of a porous structure, a narrow tube, a cavity, a recessed structure, and/or a surface area of the test diaphragm associated with the test article that differs from a surface area of a reference diaphragm associated with the reference transducer.

In certain example implementations, at least one computer processor may be configured to compute a normalized frequency response of the test article based on a comparison of a test frequency response of the test transducer and a reference frequency response of the test article.

In one example implementation, the test and reference transducers comprise different structures. In another example implementation, the test and reference transducers comprise substantially similar structures. In certain example implementations, the test article and the reference transducer are disposed opposing one another. In certain example implementations, the test article and the reference transducer are equidistant from the piston.

Certain example implementations of the test apparatus 100 may measure the frequency response of a transducer and associated geometry, while simultaneously determining the bulk modulus of the fluid through two separate techniques. From bulk modulus, the entrained and/or dissolved air can be estimated, providing a critical advancement in the field of dynamic pressure calibration.

Numerous characteristics and advantages have been set forth in the foregoing description, together with details of structure and function. While the disclosed technology has been presented in several forms herein, it may be apparent to those skilled in the art that many modifications, additions, and deletions, especially in matters of shape, size, and arrangement of parts, can be made therein without departing from the spirit and scope of the disclosure and its equivalents as set forth in the following claims. Therefore, other modifications or embodiments as may be suggested by the teachings herein are particularly reserved as they fall within the breadth and scope of the claims.

The invention claimed is:

1. A computer-implemented method, comprising:
dynamically pressurizing a liquid in a cavity associated with a housing;
while dynamically pressurizing the liquid, simultaneously measuring:
a test frequency response, by a test transducer in communication with the liquid, wherein the test transducer includes a filter section configured to dampen pressure ripples;
a reference frequency response, by a reference transducer in communication with the liquid;
determining, by one or more computer processors, a normalized frequency response of the test transducer, based at least in part on the test frequency response and the reference frequency response; and
outputting an indication of the normalized frequency response of the test transducer.

2. The method of claim 1, wherein the filter section is configured to attenuate pressure ripples over a range of pressure ripple frequencies.

3. The method of claim 1, wherein the filter section is configured to dampen high frequency pressure ripples.

4. A test apparatus, comprising:
a housing comprising a cavity configured for containing a liquid;
a reference transducer mounted on the housing and configured for communication with the liquid;
a test article comprising a test transducer and a filter configured to dampen pressure ripples, the test article coupled to the housing and further configured for communication with the liquid;
at least one acquisition system in communication with the reference transducer and the test transducer;
a piston in communication with the liquid and configured to slidingly engage with a portion of the cavity;
wherein the acquisition system is configured to determine a normalized frequency response of the test article.

5. The test apparatus of claim 4, wherein the filter is configured to attenuate pressure ripples over a a range of pressure ripple frequencies.

6. The test apparatus of claim 4, wherein the filter is configured to dampen high frequency pressure ripples.

7. The test apparatus of claim 4, wherein the acquisition system is further configured to determine a bulk modulus of the liquid.

8. The test apparatus of claim 7, wherein:
the piston is configured to dynamically pressurize the liquid in the cavity;
one or more of the reference transducer and the test transducer are configured to measure a pressure of the liquid;
a displacement of the piston is configured to measure a change in the volume of the liquid; and
the acquisition system is further configured to determine the bulk modulus based on the measured pressure and the determined change in volume of the liquid.

9. The test apparatus of claim 4, wherein the acquisition system is further configured to determine the normalized frequency response by:
storing, in a memory in communication with the acquisition system:
a test frequency response of the test transducer; and a reference frequency response of the reference transducer; and dividing the test frequency response by the reference frequency response.

10. The test apparatus of claim 4, wherein the filter comprises one or more of:
   a porous structure;
   a narrow tube;
   a cavity; and
   a diameter of the test diaphragm associated with the test article that differs from a diameter of a reference diaphragm associated with the reference transducer.

11. The test apparatus of claim 4, wherein the acquisition system is configured to compute a normalized frequency response of the test article based on dividing a test frequency response of the test transducer by a reference frequency response of the test article.

* * * * *